(12) United States Patent
Kallurkar et al.

(10) Patent No.: US 12,066,945 B2
(45) Date of Patent: Aug. 20, 2024

(54) DYNAMIC SHARED CACHE PARTITION FOR WORKLOAD WITH LARGE CODE FOOTPRINT

(71) Applicant: Intel Corporation, Santa Clara, CA (US)

(72) Inventors: Prathmesh Kallurkar, Bangalore (IN); Anant Vithal Nori, Bangalore (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 17/130,698

(22) Filed: Dec. 22, 2020

(65) Prior Publication Data

US 2022/0197794 A1  Jun. 23, 2022

(51) Int. Cl.
| | | |
|---|---|---|
| *G06F 12/084* | (2016.01) | |
| *G06F 9/50* | (2006.01) | |
| *G06F 12/0811* | (2016.01) | |
| *G06F 12/0846* | (2016.01) | |
| *G06F 12/0871* | (2016.01) | |

(52) U.S. Cl.
CPC .......... *G06F 12/084* (2013.01); *G06F 9/5016* (2013.01); *G06F 12/0811* (2013.01); *G06F 12/0848* (2013.01); *G06F 12/0871* (2013.01)

(58) Field of Classification Search
None
See application file for complete search history.

(56) References Cited

U.S. PATENT DOCUMENTS

| | | | |
|---|---|---|---|
| 6,378,044 B1 * | 4/2002 | Luce | G06F 12/128 |
| | | | 711/159 |
| 6,532,520 B1 | 3/2003 | Dean et al. | |
| 10,642,618 B1 * | 5/2020 | Hakewill | G06F 9/30054 |
| 2011/0010504 A1 * | 1/2011 | Wang | G06F 12/0848 |
| | | | 711/E12.001 |

(Continued)

OTHER PUBLICATIONS

Coutinho et al. Dynamically Reconfigurable Split Cache Architecture, IEEE 2008, pp. 163-167 (Year: 2008).*

(Continued)

*Primary Examiner* — Kaushikkumar M Patel
(74) *Attorney, Agent, or Firm* — Essential Patents Group, LLP

(57) ABSTRACT

An embodiment of an integrated circuit may comprise a core, a first level core cache memory coupled to the core, a shared core cache memory coupled to the core, a first cache controller coupled to the core and communicatively coupled to the first level core cache memory, a second cache controller coupled to the core and communicatively coupled to the shared core cache memory, and circuitry coupled to the core and communicatively coupled to the first cache controller and the second cache controller to determine if a workload has a large code footprint, and, if so determined, partition N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero. Other embodiments are disclosed and claimed.

18 Claims, 16 Drawing Sheets

(56) References Cited

U.S. PATENT DOCUMENTS

2012/0054442 A1    3/2012   Walker

OTHER PUBLICATIONS

Ayers, Grant et al., "AsmDB: Understanding and Mitigating Front-End Stalls in Warehouse-Scale Computers", ISCA '19, Jun. 22-26, 2019, 12 pgs.
Kanev, Svilen et al., "Profiling a warehouse-scale computer", ISCA 2015, 12 pgs.
Viswanathan, Krishnaswamy, "Intel Memory Latency Checker", Published Nov. 22, 2013, 10 pgs.
Extended European Search Report from European Patent Application No. 21196229.5 notified Mar. 4, 2022, 7 pgs.
Notice of Allowance from European Patent Application No. 21196229.5 notified Jun. 4, 2024, 8 pgs.

\* cited by examiner

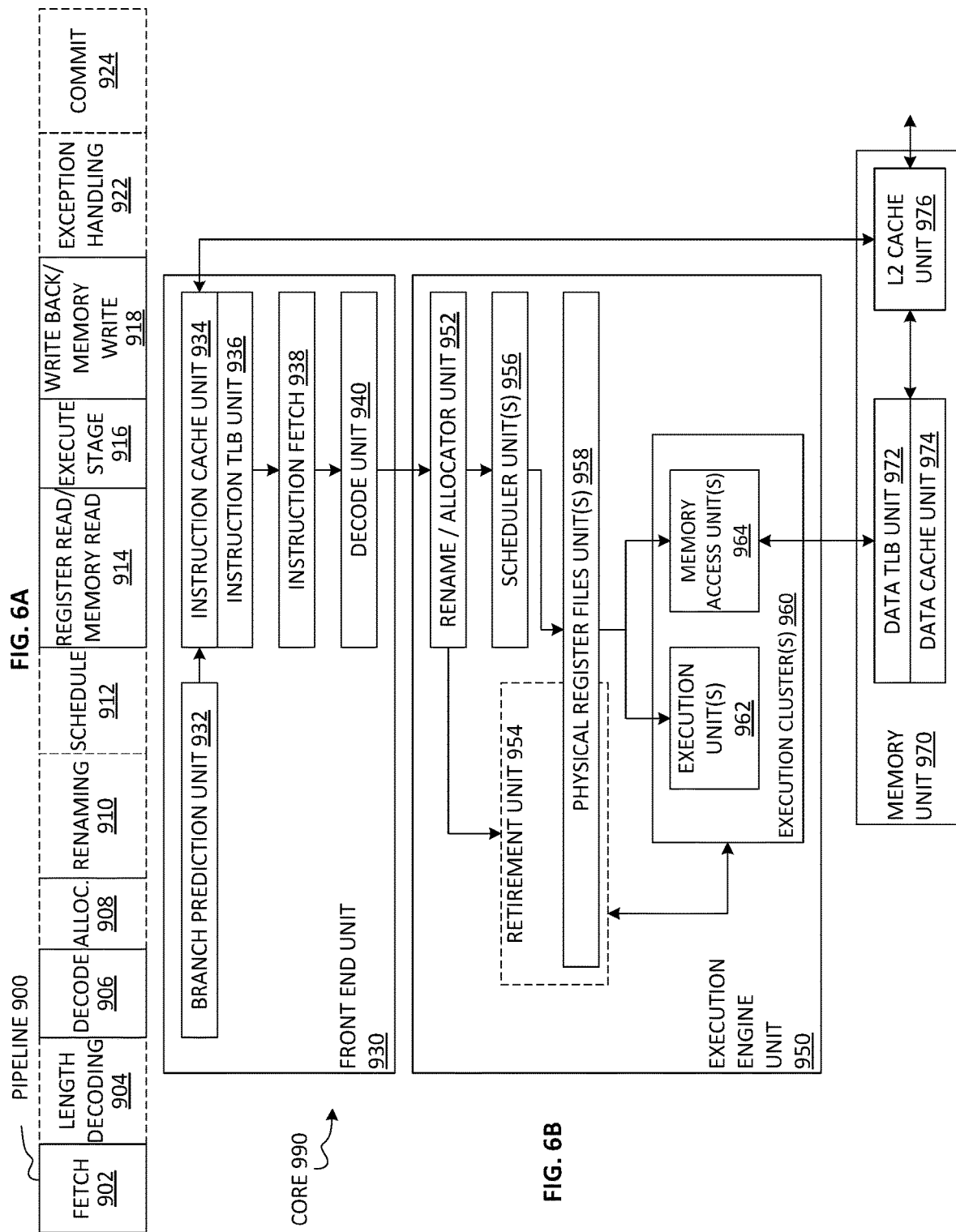

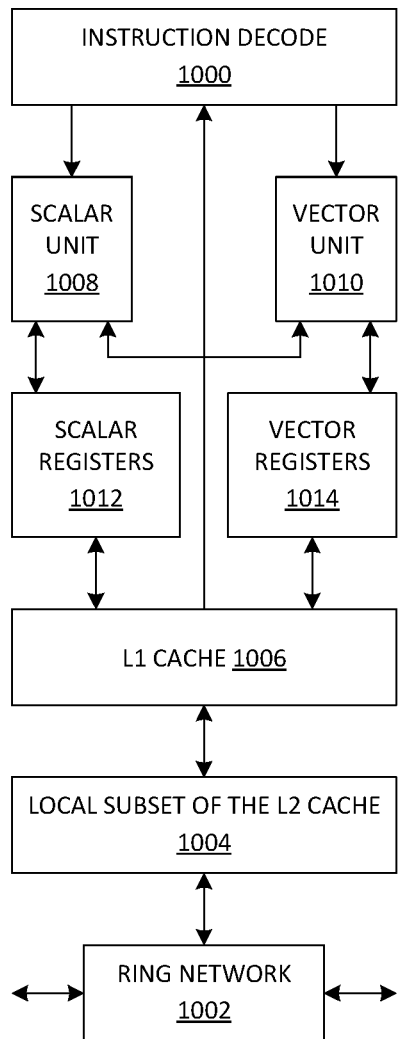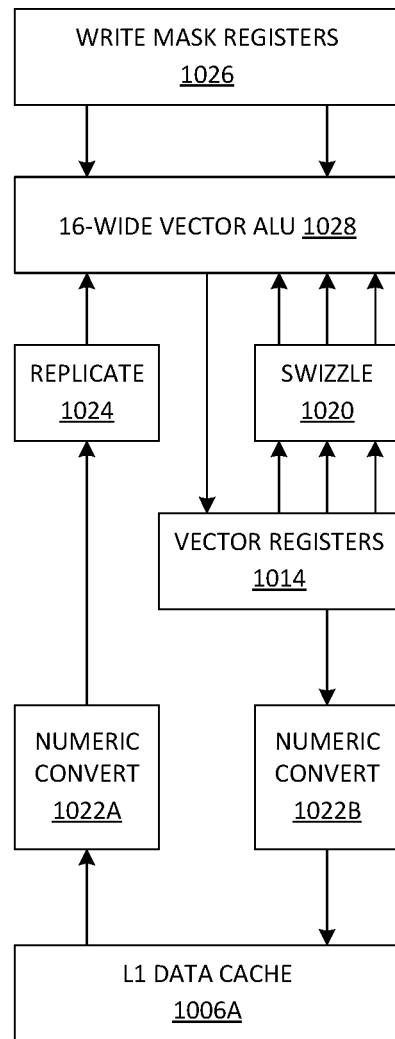
FIG. 7A
FIG. 7B

DYNAMIC SHARED CACHE PARTITION FOR WORKLOAD WITH LARGE CODE FOOTPRINT

BACKGROUND

1. Technical Field

This disclosure generally relates to processor technology, processor cache technology, and cache controller technology.

2. Background Art

For an integrated circuit chip/package that includes a processor, code and data caches closest to the processor may be referred to as first level (L1) caches (e.g., a L1 code cache and a L1 data cache). The next level caches (e.g., a second level (L2) cache, a third level cache (L3), etc.) may be referred to as mid-level cache (MLC) and may be shared by functional units in the same chip/package with the MLCs. A last level cache (LLC) may refer to a highest-level cache that may be shared by functional units in the same chip/package with the LLC.

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention;

FIGS. 7A-B illustrate a block diagram of a more specific exemplary in-order core architecture, which core would be one of several logic blocks (including other cores of the same type and/or different types) in a chip;

DETAILED DESCRIPTION

Figure 1:
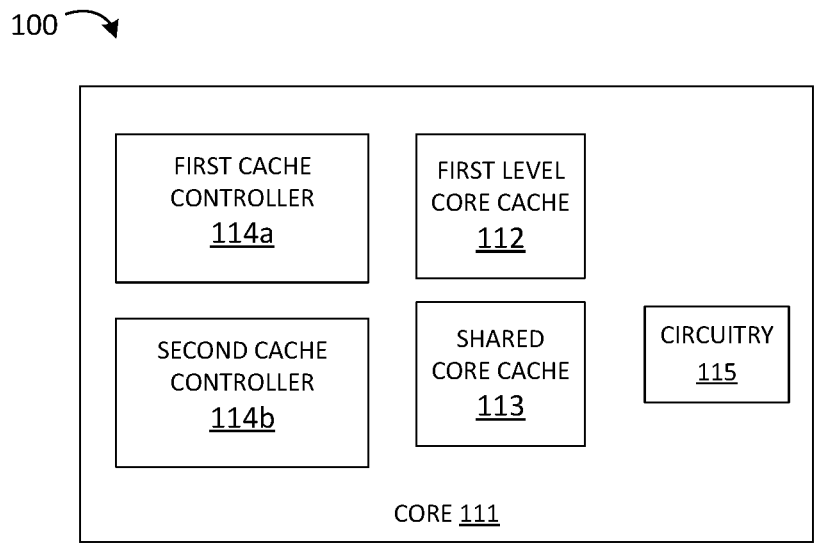
FIG. 1 is a block diagram of an example of an integrated circuit according to an embodiment.

Embodiments discussed herein variously provide techniques and mechanisms for controlling a cache. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to control or utilize a cache.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments provide technology for dynamic shared cache partitioning for workloads with large code footprints. Feature-rich client and server applications may increasingly use deep software stacks to support enhanced computing experiences for the end user. Consequently, such workloads execute a large codebase and their code footprint may be multiple megabytes (MBs). Such a large code footprint may overwhelm smaller first level (L1) code caches (e.g., with a size of 32 to 64 kilobytes (KB)) employed in some processors. The increased number of code cache lines compete with data cache lines for limited storage capacity of unified (e.g., code plus data) caches (e.g., level 2 (L2), level 3 (L3), mid-level cache (MLC), etc.). As a result, the MLCs end up evicting numerous useful data cache lines, which reduces the overall performance of many workloads.

One approach to handle the problem of increasing code and data footprints is to increase the size of the L2 cache. Some processors may employ a L2 cache size of 1 to 2 MB in order to serve increasing code and data footprints of more demanding datacenter software stacks and applications. A larger L2 cache size leads to better hit rates for code and data. Even with the increased area and power budget, however, larger L2 caches do not solve a problem of thrashing (e.g., interference) between code and data cache blocks. For some large code footprint workloads, the code footprint may be about one quarter (¼) the size of the data footprint for the workload, but the code cache lines may occupy more than one half (>50%) of the L2 storage capacity. The disproportionate amount of L2 cache occupied by code cache lines may contribute to the detrimental impact of thrashing between code and data on the presence and utility of data cache lines in the L2.

Some embodiments may provide technology for a processor's L2 cache to reduce such thrashing between code and data cache lines during the execution of large code footprint workloads. Embodiments of the technology described herein may also be employed in other shared caches, such as the LLC.

With reference to FIG. 1, an embodiment of an integrated circuit 100 may include a core 111, a first level core cache memory 112 coupled to the core 111, a shared core cache memory 113 coupled to the core 111, a first cache controller 114a coupled to the core 111 and communicatively coupled to the first level core cache memory 112, a second cache controller 114b coupled to the core 111 and communicatively coupled to the shared core cache memory 113, and circuitry 115 coupled to the core 111 and communicatively coupled to the first cache controller 114a and the second cache controller 114b to determine if a workload has a large code footprint, and, if so determined, partition N ways of the shared core cache memory 113 into first and second chunks of ways with the first chunk of M ways reserved for code cache lines from the workload and the second chunk of N minus M ways reserved for data cache lines from the workload, where N and M are positive integer values and N minus M is greater than zero.

In some embodiments, the circuitry 115 may be configured to determine if the workload has the large code footprint based on a number of first level code cache misses from the workload and a number of first level data cache misses from the workload. For example, the circuitry 115 may be further configured to count the number of first level code cache misses from the workload, count the number of first level data cache misses from the workload, and determine that the workload has the large code footprint if the counted number of first level code cache misses exceeds the counted number of first level data cache misses after a counted number of first level cache misses exceeds a threshold. In some embodiments, the circuitry 115 may also be configured to reset the number of first level code cache misses to be half of the counted number of first level code cache misses after the counted number of first level cache misses exceeds the threshold, reset the number of first level data cache misses to be half of the counted number of first level data cache misses after the counted number of first level cache misses exceeds the threshold, and reset the number of first level cache misses to zero after the counted number of first level cache misses exceeds the threshold.

In some embodiments, the circuitry 115 may be further configured to restrict code cache lines from the workload to occupy the first chunk of ways for code for the workload, and restrict data cache lines from the workload to occupy the second chunk of ways for data for the workload. For example, the circuitry 115 may be configured to decrease priority of non-hit cache lines in only the first chunk of ways for code in response to a demand hit to a cache line in the first chunk of ways for code, and decrease priority of non-hit cache lines in only the second chunk of ways for data in response to a demand hit to a cache line in the second chunk of ways for data. The circuitry 115 may also be configured to evict a lowest priority cache line from only the first chunk of ways for code to insert a code cache line in the first chunk of ways for code, and evict a lowest priority cache line from only the second chunk of ways for data to insert a data cache line in the second chunk of ways for data.

Figure 12:
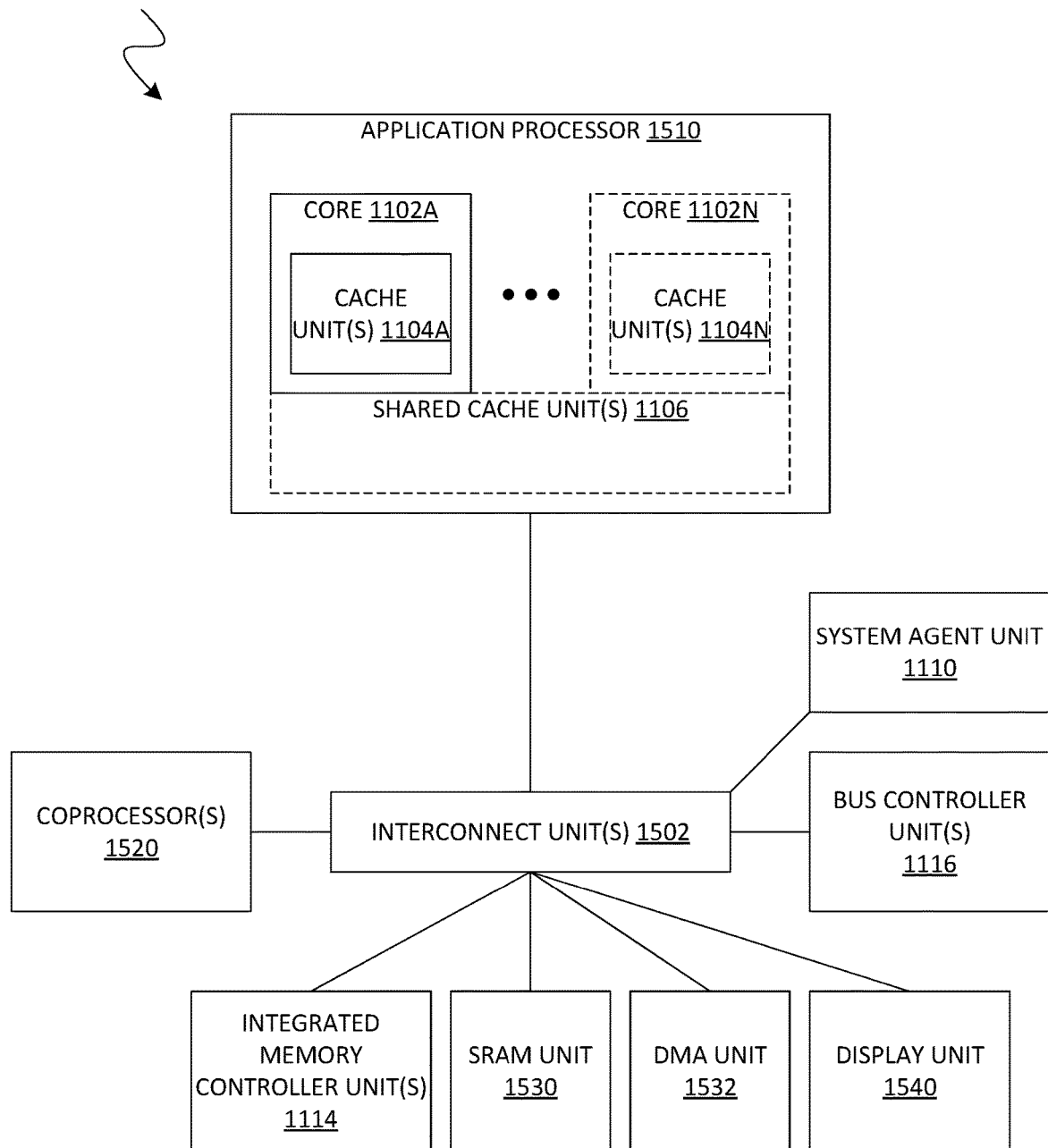
Figure 13:
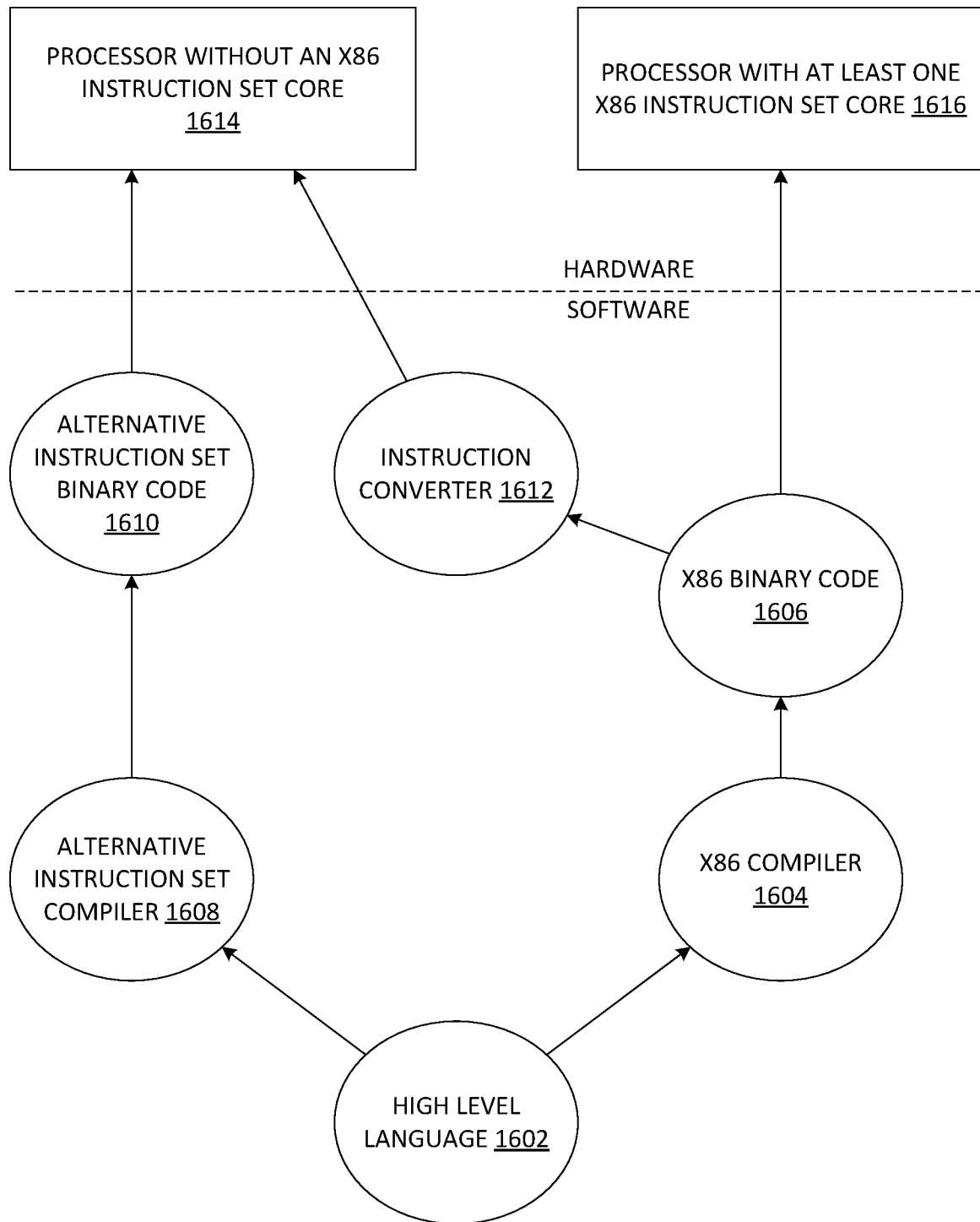
FIG. 13 is a block diagram contrasting the use of a software instruction converter to convert binary instructions in a source instruction set to binary instructions in a target instruction set according to embodiments of the invention.

Embodiments of the first level core cache memory 112, the shared core cache memory 113, the first cache controller 114a, the second cache controller 114b, and/or the circuitry 115 may be incorporated in a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13).

Figure 2A:
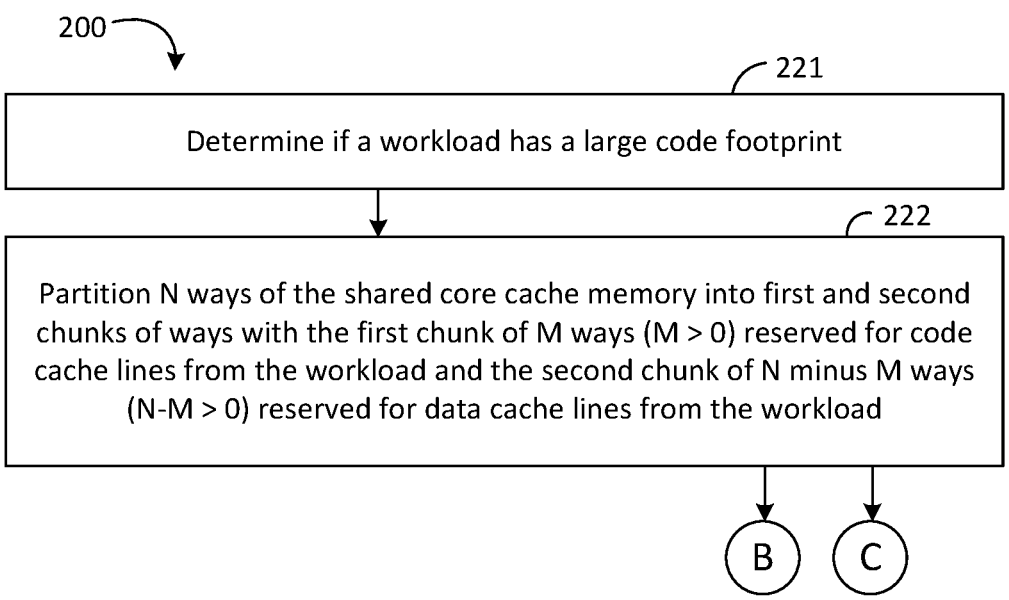
FIGS. 2A to 2C are flow diagrams of an example of a method of controlling a cache according to an embodiment.
Figure 2B:
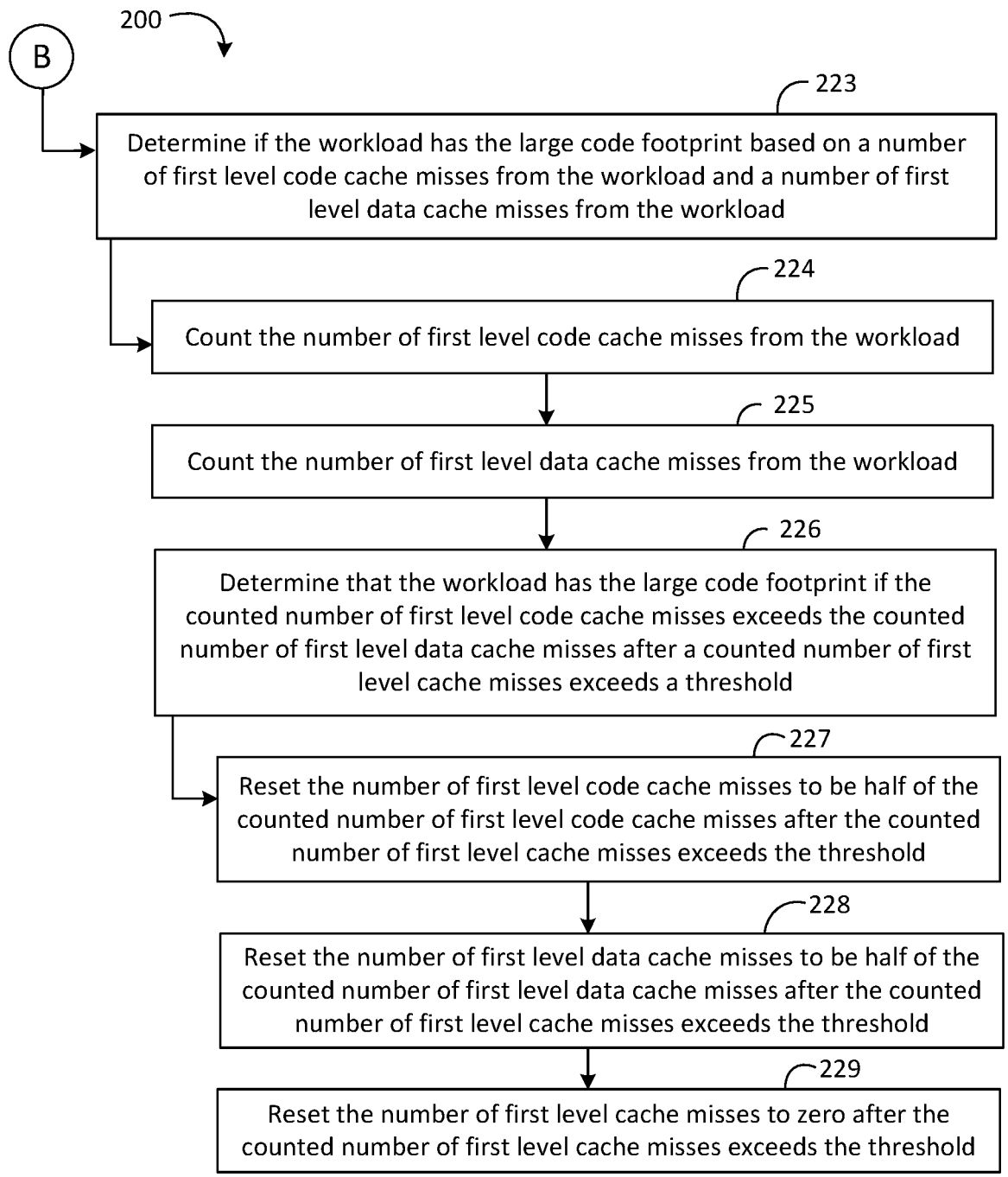
Figure 2C:
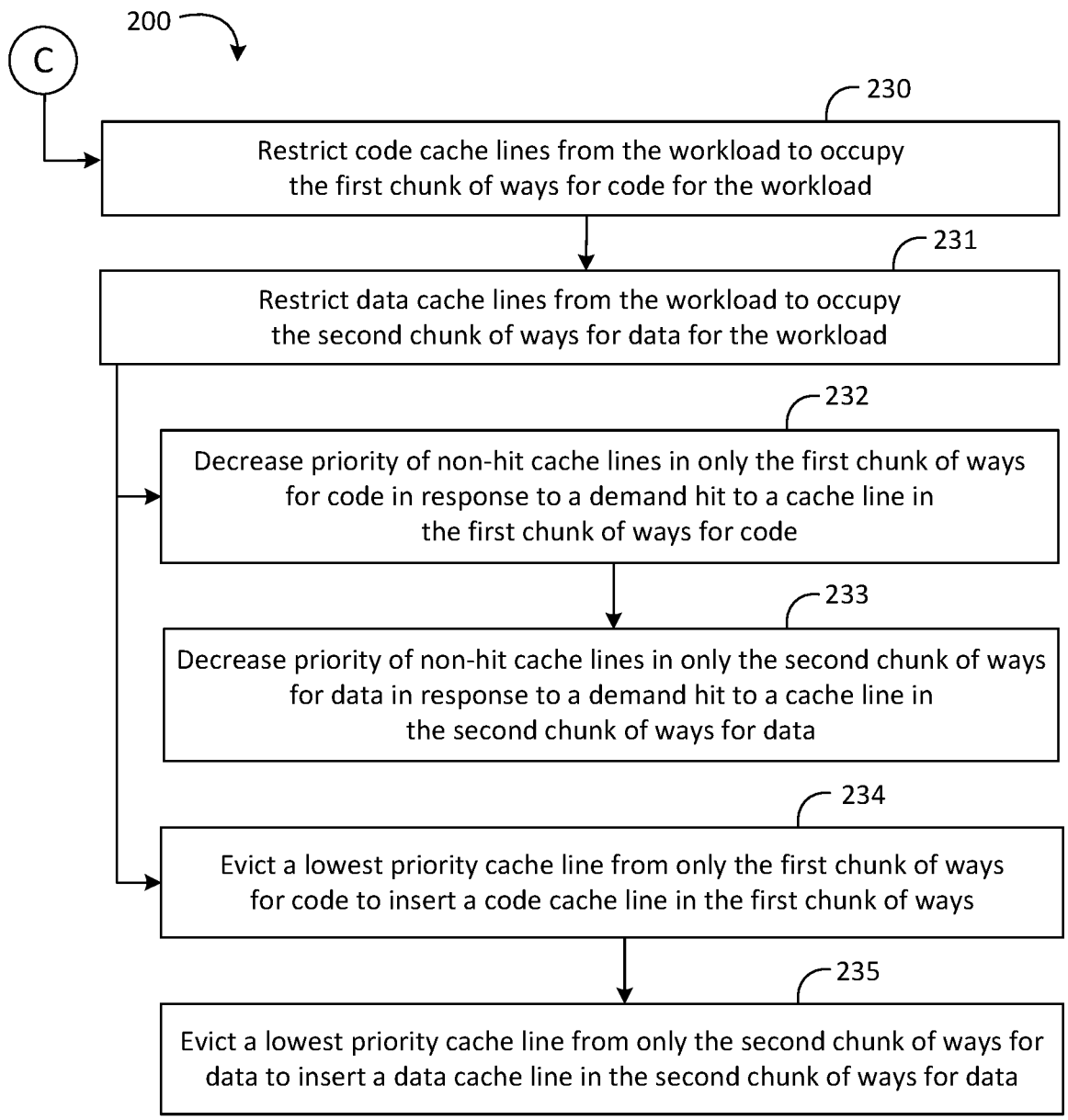

With reference to FIGS. 2A to 2C, an embodiment of a method 200 of controlling a cache may include determining if a workload has a large code footprint at box 221, and, if so determined, partitioning N ways of the shared core cache memory into first and second chunks of ways with the first chunk of M ways (M>0) reserved for code cache lines from the workload and the second chunk of N minus M ways (N−M>0) reserved for data cache lines from the workload at box 222, where N and M are positive integer values.

Some embodiments of the method 200 may include determining if the workload has the large code footprint based on a number of first level code cache misses from the workload and a number of first level data cache misses from the workload at box 223. For example, the method 200 may include counting the number of first level code cache misses from the workload at box 224, counting the number of first level data cache misses from the workload at box 225, and determining that the workload has the large code footprint if the counted number of first level code cache misses exceeds the counted number of first level data cache misses after a counted number of first level cache misses exceeds a threshold at box 226. Some embodiments of the method 200 may also include resetting the number of first level code cache misses to be half of the counted number of first level code cache misses after the counted number of first level cache misses exceeds the threshold at box 227, resetting the number of first level data cache misses to be half of the counted number of first level data cache misses after the counted number of first level cache misses exceeds the threshold at box 228, and resetting the number of first level cache misses to zero after the counted number of first level cache misses exceeds the threshold at box 229.

Some embodiments of the method 200 may further include restricting code cache lines from the workload to occupy the first chunk of ways for code for the workload at box 230, and restricting data cache lines from the workload to occupy the second chunk of ways for data for the workload at box 231. For example, the method 200 may also include decreasing priority of non-hit cache lines in only the first chunk of ways for code in response to a demand hit to a cache line in the first chunk of ways for code at box 232, and decreasing priority of non-hit cache lines in only the second chunk of ways for data in response to a demand hit to a cache line in the second chunk of ways for data at box 233. Some embodiments of the method 200 may further include evicting a lowest priority cache line from only the first chunk of ways for code to insert a code cache line in the first chunk of ways for code at box 234, and evicting a lowest priority cache line from only the second chunk of ways for data to insert a data cache line in the second chunk of ways for data at box 235.

Figure 3:
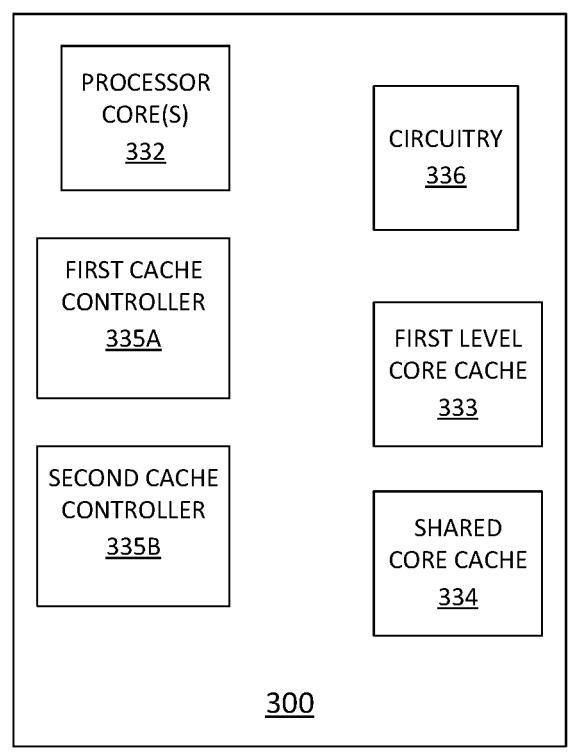
FIG. 3 is a block diagram of an example of an apparatus according to an embodiment.

With reference to FIG. 3, an embodiment of an apparatus 300 may include one or more processor cores 332, a first level core cache memory 333, a shared core cache memory 334, a first cache controller 335A communicatively coupled to the first level core cache memory 333, a second cache controller 335B communicatively coupled to the shared core cache memory 334, and circuitry 336 communicatively coupled to the first cache controller 335A and the second cache controller 335B to determine if a workload has a large code footprint, and, if so determined, partition N ways of the shared core cache memory 334 into first and second chunks of ways with the first chunk of M ways reserved for code cache lines from the workload and the second chunk of N minus M ways reserved for data cache lines from the workload, where N and M are positive integer values and N minus M is greater than zero.

In some embodiments, the circuitry 336 may be configured to determine if the workload has the large code footprint based on a number of first level code cache misses from the workload and a number of first level data cache misses from the workload. For example, the circuitry 336 may be further configured to count the number of first level code cache misses from the workload, count the number of first level data cache misses from the workload, and determine that the workload has the large code footprint if the counted number of first level code cache misses exceeds the counted number of first level data cache misses after a counted number of first level cache misses exceeds a threshold. In some embodiments, the circuitry 336 may also be configured to reset the number of first level code cache misses to be half of the counted number of first level code cache misses after the counted number of first level cache misses exceeds the threshold, reset the number of first level data cache misses to be half of the counted number of first level data cache misses after the counted number of first level cache misses exceeds the threshold, and reset the number of first level cache misses to zero after the counted number of first level cache misses exceeds the threshold.

In some embodiments, the circuitry 336 may be further configured to restrict code cache lines from the workload to occupy the first chunk of ways for code for the workload, and restrict data cache lines from the workload to occupy the second chunk of ways for data for the workload. For example, the circuitry 336 may be configured to decrease priority of non-hit cache lines in only the first chunk of ways for code in response to a demand hit to a cache line in the first chunk of ways for code, and decrease priority of non-hit cache lines in only the second chunk of ways for data in response to a demand hit to a cache line in the second chunk of ways for data. The circuitry 336 may also be configured to evict a lowest priority cache line from only the first chunk of ways for code to insert a code cache line in the first chunk of ways for code, and evict a lowest priority cache line from only the second chunk of ways for data to insert a data cache line in the second chunk of ways for data.

Embodiments of the first level core cache 333, the shared core cache 334, the first cache controller 335A, the second cache controller 335B, and/or the circuitry 336 may be integrated with processors including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13).

Some embodiments may provide technology to dynamically partition an L2 cache into separate (e.g., distinct) code and data ways. Some embodiments may first dynamically detect the execution of a large code footprint workload by observing the ratio of code to data requests at the L2 cache. When operating with large code footprints, some embodiments may dynamically partition the L2 cache in code and data ways by controlling mutually exclusive subsets of ways into which code and data requests can fill or for which code and data requests may modify least recently used (LRU) information associated with the cache entries. Advantageously, some embodiments may incur little or no hardware overhead and may reduce or eliminate thrashing between code and data in the shared L2 cache. As compared to increasing L2 cache size, some embodiments advantageously provide area and power efficient technology to increase the L2 hit rate and also provide performance gains for workloads with large code footprints. Embodiments may further provide dynamic learning technology to ensure that the dynamic shared cache partitioning does not lead to a negative impact for workloads that do not have large code footprints.

For a large number of large code footprint workloads, code cache lines may occupy greater than 50-60% of the L2 cache capacity. Some embodiments may advantageously constrain code cache lines for a large code footprint workload to occupy a smaller portion of the L2 cache, such that data cache lines observe better locality, and the workload's overall performance increases (e.g., due to increased data hit rate in the L2 cache). Some embodiments detect the execution of large code footprint traces at run time. For such detected workloads, some embodiments dynamically partition the L2 cache in to distinct components for code and data. For an L2 cache with 16 ways, for example, some embodiments may restrict code cache lines to occupy only M ways and allow data cache lines to occupy the remaining 16-M ways. Some embodiments may set M to a fixed value of about twenty five percent (25%) of the L2 space for code (e.g., M=4, or 25% of the space for code in an L2 cache with 16 ways). Alternatively, some embodiments may provide technology for M to be configurable (e.g., per processor, based on the characteristics of a specific workload, based on an application/customer setting, etc.).

Figure 4A:
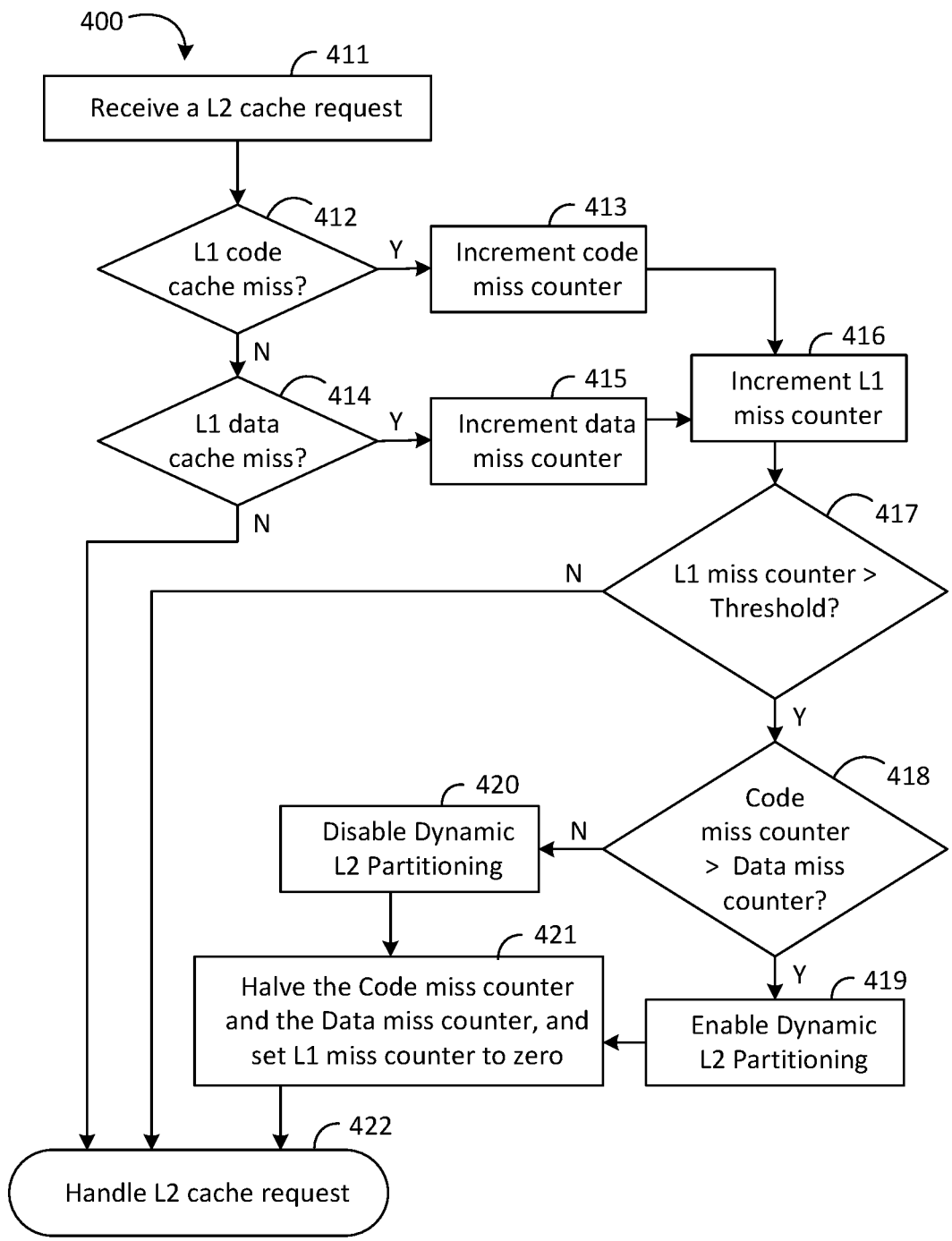
FIGS. 4A to 4C are flow diagrams of another example of a method of controlling a cache according to an embodiment.
Figure 4B:
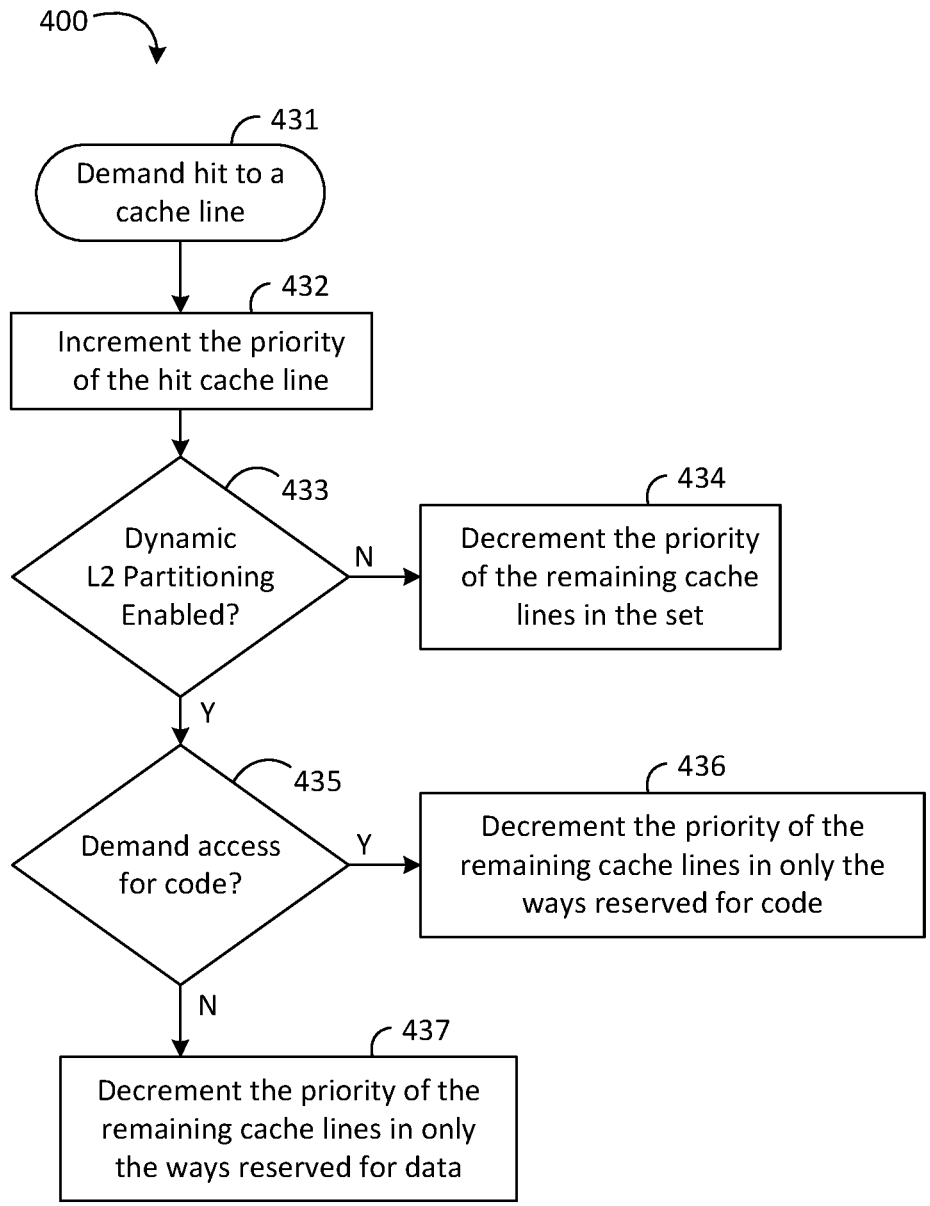
Figure 4C:
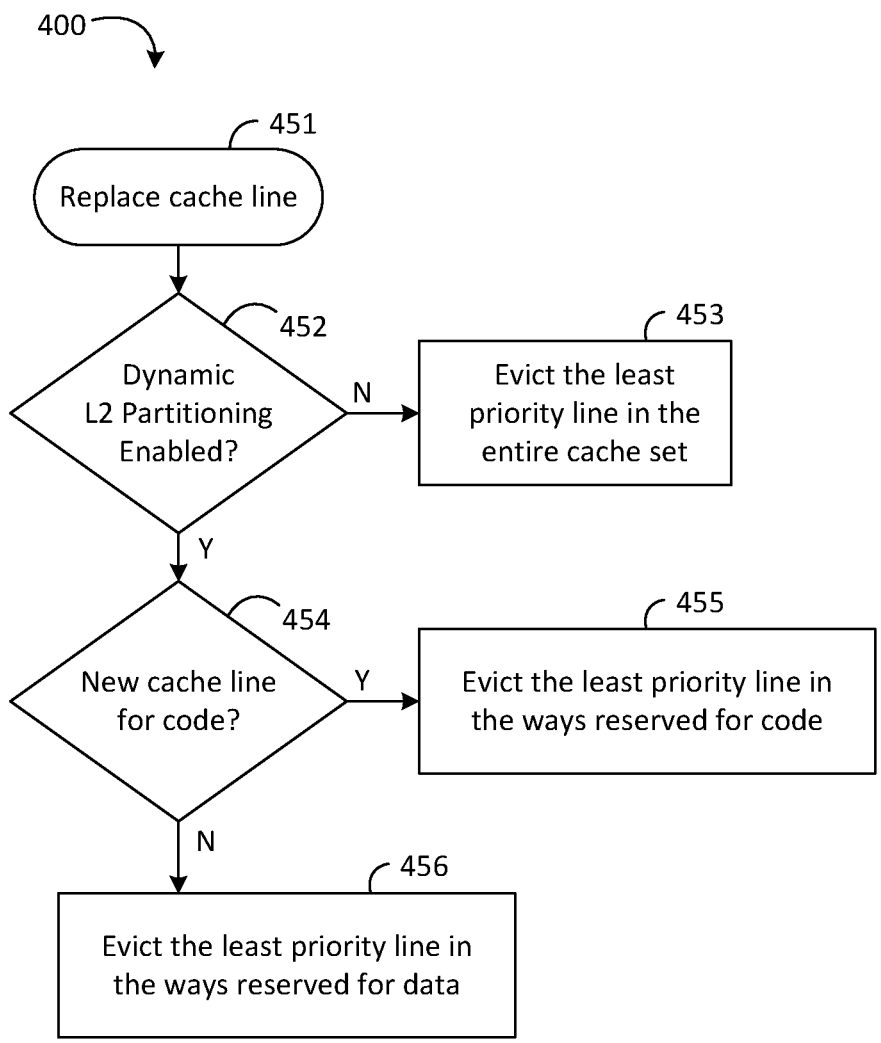

With reference to FIGS. 4A to 4C, an embodiment of a method 400 of controlling a cache may include an example process for detecting large code footprint traces. The method 400 includes receiving an L2 cache request at box 411. The method 400 may then proceed to determining if the request corresponds to a L1 code cache miss at box 412 and, if so, incrementing a code miss counter at box 413 (e.g., which may have been previously initialized with a zero value) and incrementing a L1 miss counter at box 416. Otherwise, the method 400 may proceed to determining if the request corresponds to a L1 data cache miss at box 414 and, if so, incrementing a data miss counter at box 415 (e.g., which may have been previously initialized with a zero value) and incrementing the L1 miss counter at box 416. If the L2 cache request does not correspond to either a L1 code cache miss at box 412 or a L1 data cache miss at box 414, the method 400 may proceed to handle the L2 cache request at box 422. After incrementing the L1 miss counter at box 416, the method 400 may proceed to determining if the L1 miss counter exceeds a threshold (e.g., is greater than a threshold of 1000 combined misses) at box 417. If not, the method 400 may proceed to handle the L2 cache request at box 422. If the L1 miss counter exceeds the threshold at box 417, the method 400 may proceed to determining if the code miss counter is greater than the data miss counter at box 418. If so, the method 400 may proceed to enabling dynamic L2 partitioning at box 419. Otherwise, the method 400 may proceed to disabling dynamic L2 partitioning at box 420. After dynamic L2 partitioning is either enabled at box 419 or disabled at box 420, the method 400 may proceed to halving both of the code miss and data miss counters, and setting the L1 miss counter to zero at box 421 before handling the L2 cache request at box 422.

Some embodiments of the method 400 may further include handling a demand to a cache line at box 431 as follows. The method 400 may proceed to incrementing the priority of the hit cache line at box 432 and, if dynamic L2 partitioning is disabled at box 433, decrementing the priority of the remaining cache lines in the set at box 434. If dynamic L2 partitioning is enabled at box 433, the method 400 may proceed to determining if the demand access is for code at box 435 and, if so, decrementing the priority of the remaining cache lines in only the ways reserved for code at box 436. Otherwise, the method 400 may proceed to decrementing the priority of the remaining cache lines in only the ways reserved for data at box 437.

Some embodiments of the method 400 may further include replacing a cache line at box 451 as follows. If dynamic L2 partitioning is disabled at box 452, the method 400 may proceed to evicting the least priority line in the entire cache set at box 453. If dynamic L2 partitioning is enabled at box 452, the method 400 may proceed to determining if the new cache line is for code at box 454 and, if so, evicting the least priority line in the ways reserved for code at box 455. Otherwise, the method 400 may proceed to evicting the least priority line in the ways reserved for data at box 456.

Figure 5:
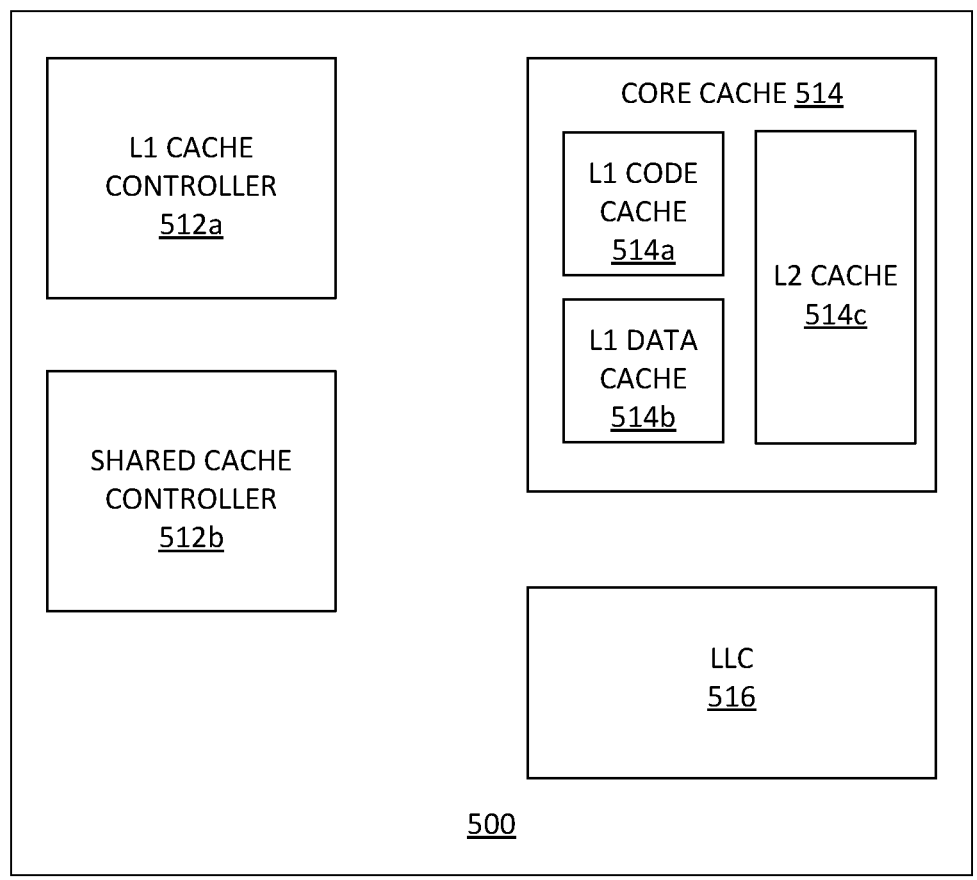
FIG. 5 is a block diagram of an example of a cache system according to an embodiment.

With reference to FIG. 5, an embodiment of a cache system 500 includes a L1 cache controller 512a coupled to a core cache 514 and a shared cache controller 512b coupled to the core cache 514 and a LLC 516. The core cache 514 includes a L1 code cache 514a, a L1 data cache 514b, and a L2 cache 514c. For example, the L2 cache 514c receives requests from three sources including the L1 code cache 514a, the L1 data cache 514b, and L2 prefetchers. For large code footprint workloads, the L2 cache 514b receives more requests from the L1 code cache 514a as compared to the L1 data cache 514b. To detect a workload with a large code footprint, the L1 cache controller 512a tracks the number of requests from each L1 cache source (e.g., with a 32-bit counter). After an epoch of, for example, 1000 L2 requests from these caches, the number of requests from each cache source are compared. If more L1 code cache requests were received as compared to L1 data cache requests, the shared cache controller 512b enables dynamic partitioning of the L2 cache 514c. Otherwise, the shared cache controller 512b disables dynamic partitioning and keeps the L2 cache 514c as un-partitioned. In some embodiments, the L1 cache controller 512a halves the L1 request counters after every epoch to add hysteresis to the partitioning logic.

When dynamic partitioning is enabled, the shared cache controller 512b enforces partitioning of the L2 cache 514c by assigning separate ways to store code and data cache lines. An example L2 cache set contains 16 ways that are shared by both code and data cache lines. To enable partitioning, the shared cache controller 512b reserves the first M (e.g., M=4 for this example) ways to store code cache lines and remaining 16-M (e.g., 12 for this example) ways to store data cache lines. The shared cache controller 512b may achieve the partitioning by modifying the flows that change the priority of an L2 cache line.

For a demand hit to a cache line in the L2 cache 514c when partitioning is disabled, for example, the shared cache controller 512b increments the priority of the hit cache line and decrements the priority of the remaining 15 lines in the cache set. For a demand hit to a cache line in the L2 cache 514c when partitioning is enabled, for example, depending on whether the demand access is for code or data, the shared cache controller 512b decrements the priority of only the lines belonging to the access type's reserved ways (e.g., for data: the remaining 11 lines of the 12 ways for data; and for code: the remaining 3 lines of the 4 ways for code). To replace a cache line for an unpartitioned cache (e.g., when partitioning is disabled), on inserting a new cache line, for example, the shared cache controller 512b evicts the least priority line in the entire cache set. For a partitioned cache (e.g., when partitioning is enabled), depending on whether the access is for code or data, the shared cache controller 512b evicts the least priority line in the reserved ways that correspond to the access type (e.g., for data: the controller picks the least priority line in the 12 ways for data; and for code: the controller picks the least priority line the 4 ways for code).

In some embodiments of the cache system 500, the information about whether an access is for code or data is made available at the time of inserting the access in a buffer that stores cache requests that are waiting for L2 arbitration. Accesses emanating from the L1 code cache 514a and L1 data cache 514a are tagged as code and data accesses, respectively. Additionally, prefetches triggered due to a cache access are tagged with the same category as the original access.

Embodiments of the ways partitioned between data and code may be considered as mutually exclusive because accesses tagged as code are inserted in the code ways and accesses tagged as data are inserted in the data ways. With respect to the content, however, some workloads may include self-modifying code such that the workload can modify code at run time and may use the same cache line as data (e.g., to modify code) and code (e.g., while executing instructions in newly generated code). Some embodiments may provide technology to handle workloads with self-modifying code. For a cache lookup for example, the shared cache controller 512b may keep the lookup logic for the L2 cache 514c unchanged. Accordingly, regardless of whether the cache access is for code or data, the shared cache controller 512b will lookup all 16 ways of the L2 cache 514c.

The shared cache controller 512b may detect an incorrectly assigned partition as follows. At the time of modifying code, the workloads treat constituent cache lines for updated code region as data (e.g., because update to such lines is through stores coming from the L1 data cache). Accordingly, the shared cache controller 512b inserts such lines into the reserved data ways of the L2 cache 514c. On accessing such cache lines for code, the shared cache controller 512b detects this anomaly of cache line placement (e.g., in data reserved ways instead of code reserved ways). The shared cache controller 512b does not increase the priority for such cache lines, which ensures that the line remains at a lower priority, and accordingly, the line will be evicted from the L2 cache 514c and may be inserted at a later time in the correct reserved way.

Advantageously, embodiments of the cache system 500 may involve little or no hardware overhead to increase the hit rate for the L2 cache 514c and to reduce or eliminate thrashing between code and data in the shared L2 cache 514c. The increased L2 hit rate also provides significant overall performance gains for workloads with large code footprints.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 6B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 8:
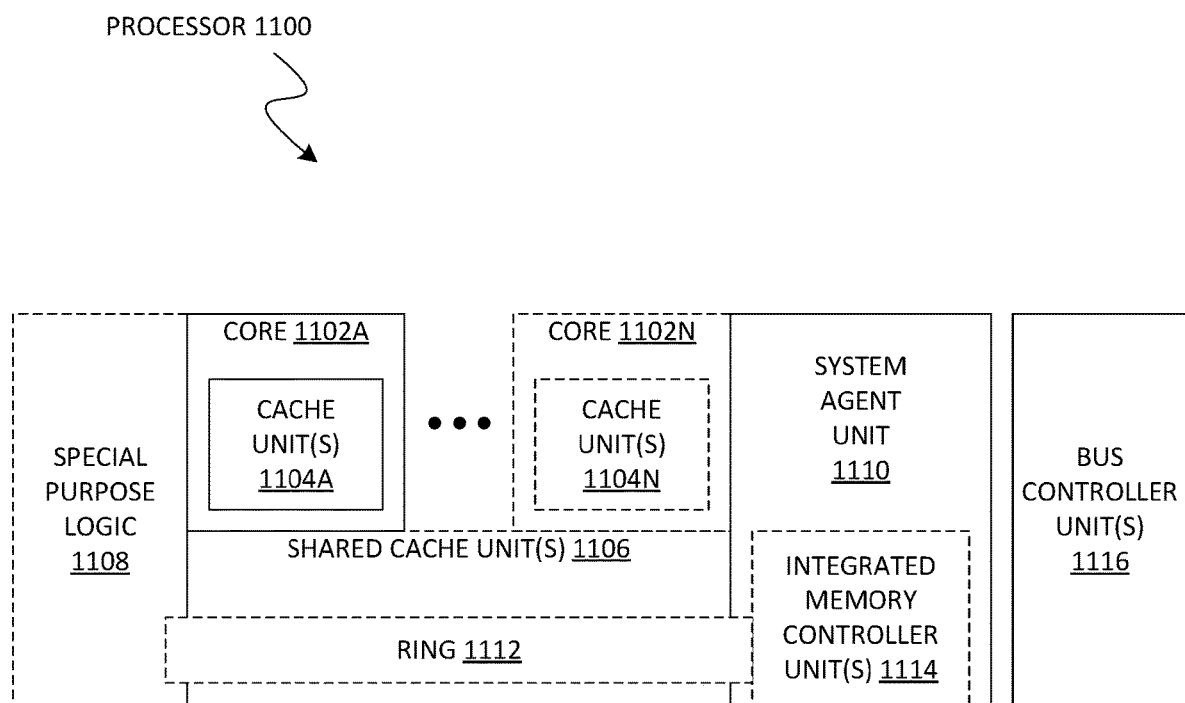
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
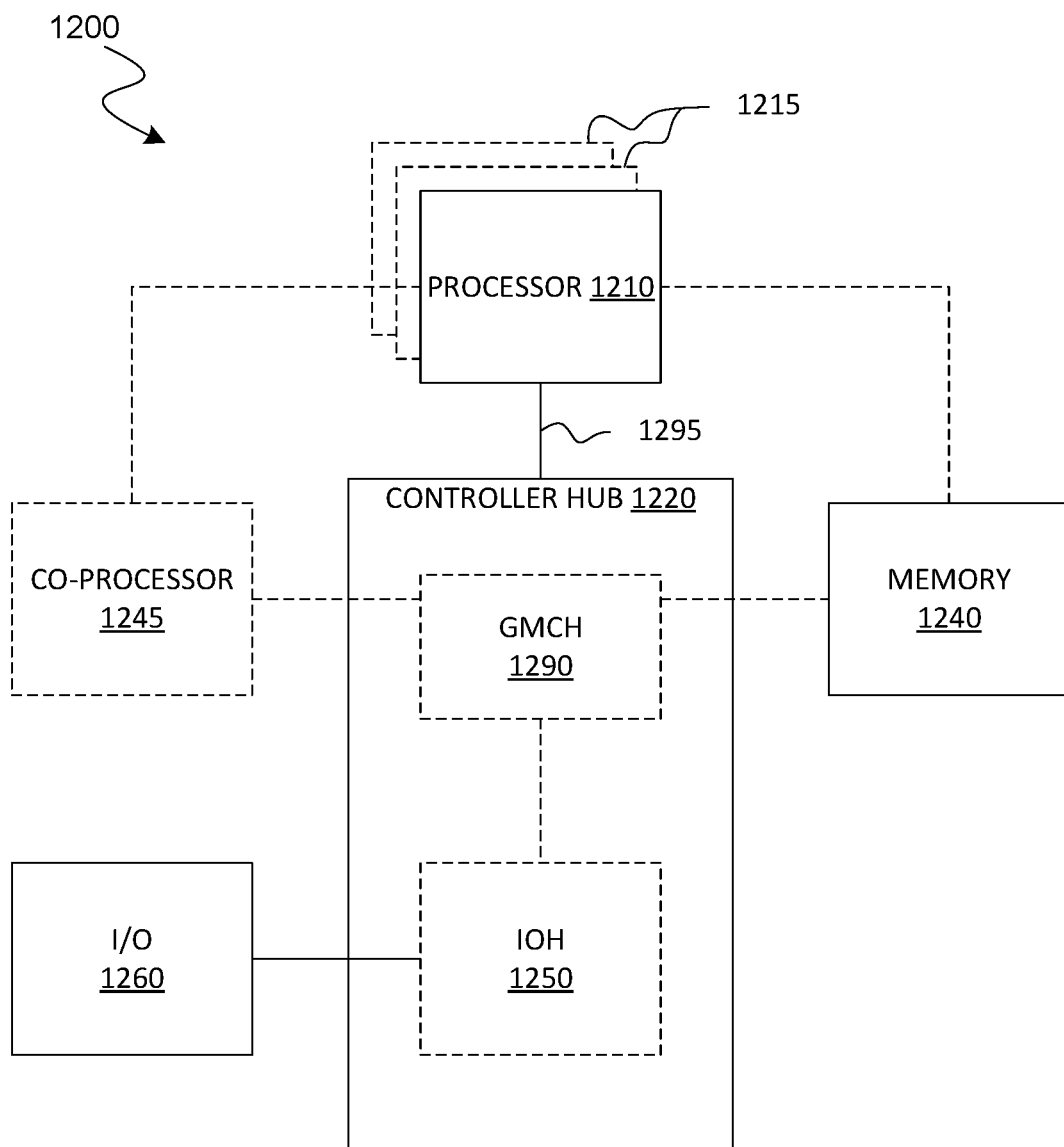
FIGS. 9-12 are block diagrams of exemplary computer architectures.

Referring now to FIG. 9, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 10:
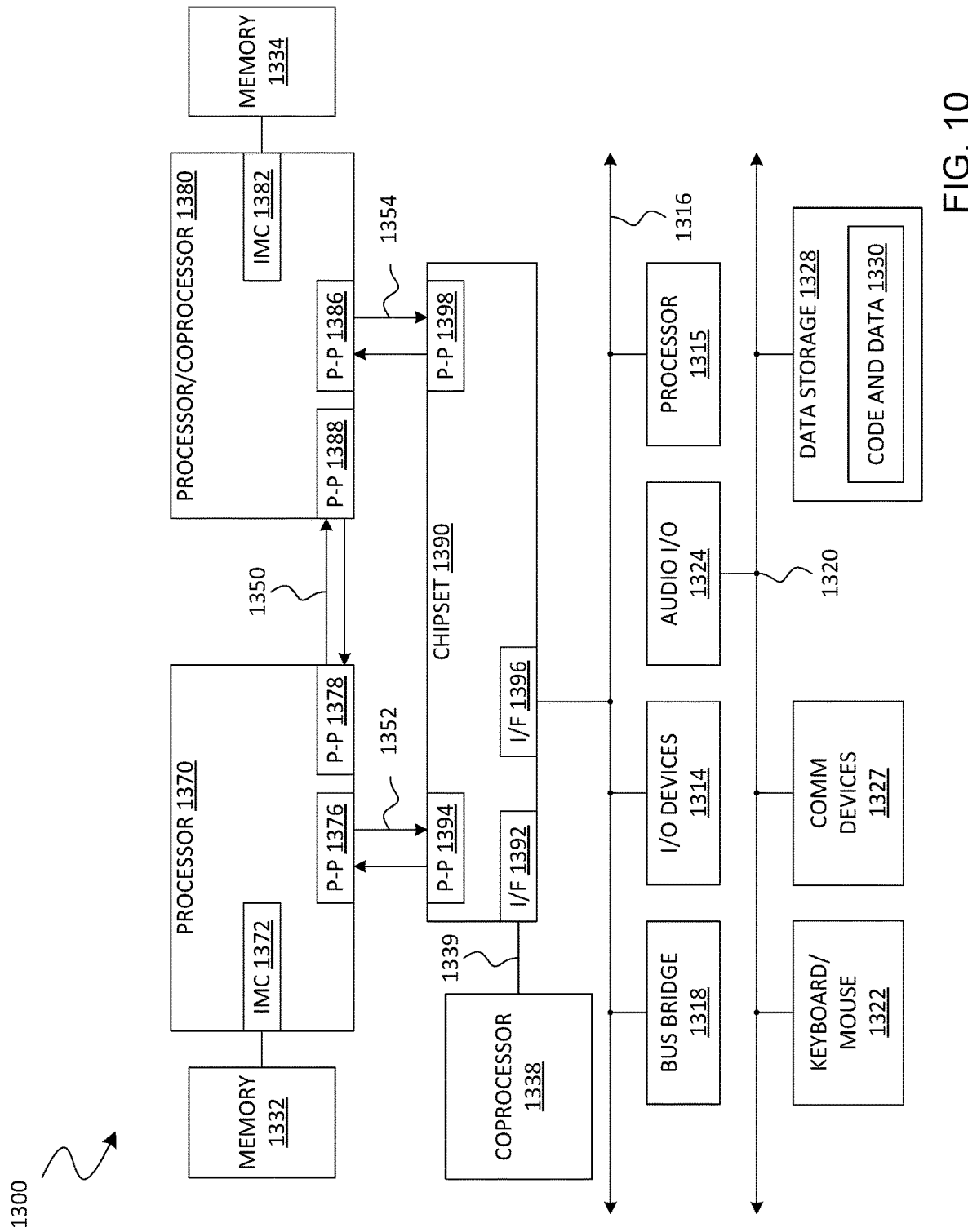

Referring now to FIG. 10, shown is a block diagram of a first more specific exemplary system 1300 in accordance with an embodiment of the present invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

Figure 11:
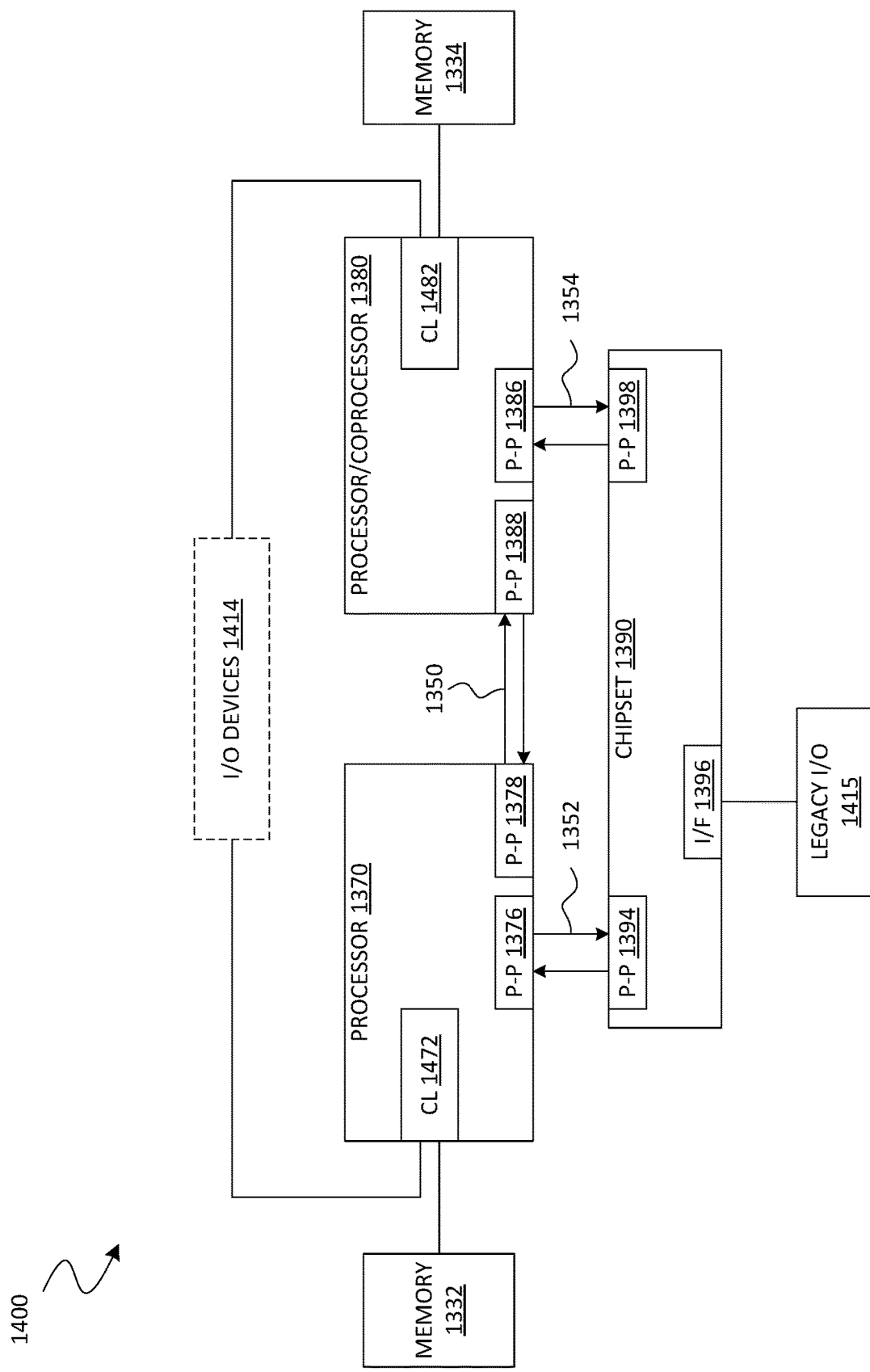

Referring now to FIG. 11, shown is a block diagram of a second more specific exemplary system 1400 in accordance with an embodiment of the present invention Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1472 and 1482, respectively. Thus, the CL 1472, 1482 include integrated memory controller units and include I/O control logic. FIG. 11 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 12, shown is a block diagram of a SoC 1500 in accordance with an embodiment of the present invention. Similar elements in FIG. 8 bear like reference numerals. Also, dashed lined boxes are optional features on more advanced SoCs. In FIG. 12, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 13 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for instruction set architecture opcode parameterization are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Additional Notes and Examples

Example 1 includes an integrated circuit, comprising a core, a first level core cache memory coupled to the core, a shared core cache memory coupled to the core, a first cache controller coupled to the core and communicatively coupled to the first level core cache memory, a second cache controller coupled to the core and communicatively coupled to the shared core cache memory, and circuitry coupled to the core and communicatively coupled to the first cache controller and the second cache controller to determine if a workload has a large code footprint, and, if so determined, partition N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

Example 2 includes the integrated circuit of Example 1, wherein the circuitry is further to determine if the workload has the large code footprint based on a number of first level code cache misses from the workload and a number of first level data cache misses from the workload.

Example 3 includes the integrated circuit of Example 2, wherein the circuitry is further to count the number of first level code cache misses from the workload, count the number of first level data cache misses from the workload, and determine that the workload has the large code footprint if the counted number of first level code cache misses exceeds the counted number of first level data cache misses after a counted number of first level cache misses exceeds a threshold.

Example 4 includes the integrated circuit of Example 3, wherein the circuitry is further to reset the number of first level code cache misses to be half of the counted number of first level code cache misses after the counted number of first level cache misses exceeds the threshold, reset the number of first level data cache misses to be half of the counted number of first level data cache misses after the counted number of first level cache misses exceeds the threshold, and reset the number of first level cache misses to zero after the counted number of first level cache misses exceeds the threshold.

Example 5 includes the integrated circuit of any of Examples 1 to 4, wherein the circuitry is further to restrict code cache lines from the workload to occupy the first chunk of ways for code for the workload, and restrict data cache lines from the workload to occupy the second chunk of ways for data for the workload.

Example 6 includes the integrated circuit of Example 5, wherein the circuitry is further to decrease priority of non-hit cache lines in only the first chunk of ways for code in response to a demand hit to a cache line in the first chunk of ways for code, and decrease priority of non-hit cache lines in only the second chunk of ways for data in response to a demand hit to a cache line in the second chunk of ways for data.

Example 7 includes the integrated circuit of any of Examples 5 to 6, wherein the circuitry is further to evict a lowest priority cache line from only the first chunk of ways for code to insert a code cache line in the first chunk of ways for code, and evict a lowest priority cache line from only the second chunk of ways for data to insert a data cache line in the second chunk of ways for data.

Example 8 includes a method of controlling a cache, comprising determining if a workload has a large code footprint, and, if so determined, partitioning N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

Example 9 includes the method of Example 8, further comprising determining if the workload has the large code footprint based on a number of first level code cache misses from the workload and a number of first level data cache misses from the workload.

Example 10 includes the method of Example 9, further comprising counting the number of first level code cache misses from the workload, counting the number of first level data cache misses from the workload, and determining that the workload has the large code footprint if the counted number of first level code cache misses exceeds the counted number of first level data cache misses after a counted number of first level cache misses exceeds a threshold.

Example 11 includes the method of Example 10, further comprising resetting the number of first level code cache misses to be half of the counted number of first level code cache misses after the counted number of first level cache misses exceeds the threshold, resetting the number of first level data cache misses to be half of the counted number of first level data cache misses after the counted number of first level cache misses exceeds the threshold, and resetting the number of first level cache misses to zero after the counted number of first level cache misses exceeds the threshold.

Example 12 includes the method of any of Examples 8 to 11, further comprising restricting code cache lines from the workload to occupy the first chunk of ways for code for the workload, and restricting data cache lines from the workload to occupy the second chunk of ways for data for the workload.

Example 13 includes the method of Example 12, further comprising decreasing priority of non-hit cache lines in only the first chunk of ways for code in response to a demand hit to a cache line in the first chunk of ways for code, and decreasing priority of non-hit cache lines in only the second chunk of ways for data in response to a demand hit to a cache line in the second chunk of ways for data.

Example 14 includes the method of any of Examples 12 to 13, further comprising evicting a lowest priority cache line from only the first chunk of ways for code to insert a code cache line in the first chunk of ways for code, and evicting a lowest priority cache line from only the second chunk of ways for data to insert a data cache line in the second chunk of ways for data.

Example 15 includes an apparatus, comprising one or more processor cores, a first level core cache memory, a shared core cache memory, a first cache controller communicatively coupled to the first level core cache memory, a second cache controller communicatively coupled to the shared core cache memory, and circuitry communicatively coupled to the first cache controller and the second cache controller to determine if a workload has a large code footprint, and, if so determined, partition N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

Example 16 includes the apparatus of Example 15, wherein the circuitry is further to determine if the workload has the large code footprint based on a number of first level code cache misses from the workload and a number of first level data cache misses from the workload.

Example 17 includes the apparatus of Example 16, wherein the circuitry is further to count the number of first level code cache misses from the workload, count the number of first level data cache misses from the workload, and determine that the workload has the large code footprint if the counted number of first level code cache misses exceeds the counted number of first level data cache misses after a counted number of first level cache misses exceeds a threshold.

Example 18 includes the apparatus of Example 17, wherein the circuitry is further to reset the number of first level code cache misses to be half of the counted number of first level code cache misses after the counted number of first level cache misses exceeds the threshold, reset the number of first level data cache misses to be half of the counted number of first level data cache misses after the counted number of first level cache misses, and reset the number of first level cache misses to zero after the counted number of first level cache misses exceeds the threshold.

Example 19 includes the apparatus of any of Examples 15 to 18, wherein the circuitry is further to restrict code cache lines from the workload to occupy the first chunk of ways for code for the workload, and restrict data cache lines from the workload to occupy the second chunk of ways for data for the workload.

Example 20 includes the apparatus of Example 19, wherein the circuitry is further to decrease priority of non-hit cache lines in only the first chunk of ways for code in response to a demand hit to a cache line in the first chunk of ways for code, and decrease priority of non-hit cache lines in only the second chunk of ways for data in response to a demand hit to a cache line in the second chunk of ways for data.

Example 21 includes the apparatus of any of Examples 19 to 20, wherein the circuitry is further to evict a lowest priority cache line from only the first chunk of ways for code to insert a code cache line in the first chunk of ways for code, and evict a lowest priority cache line from only the second chunk of ways for data to insert a data cache line in the second chunk of ways for data.

Example 22 includes a cache controller apparatus, comprising determining if a workload has a large code footprint, and, if so determined, partitioning N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

Example 23 includes the apparatus of Example 22, further comprising means for determining if the workload has the large code footprint based on a number of first level code cache misses from the workload and a number of first level data cache misses from the workload.

Example 24 includes the apparatus of Example 23, further comprising means for counting the number of first level code cache misses from the workload, means for counting the number of first level data cache misses from the workload, and means for determining that the workload has the large code footprint if the counted number of first level code cache misses exceeds the counted number of first level data cache misses after a counted number of first level cache misses exceeds a threshold.

Example 25 includes the apparatus of Example 24, further comprising means for resetting the number of first level code cache misses to be half of the counted number of first level code cache misses after the counted number of first level cache misses exceeds the threshold, means for resetting the number of first level data cache misses to be half of the counted number of first level data cache misses after the counted number of first level cache misses exceeds the threshold, and means for resetting the number of first level cache misses to zero after the counted number of first level cache misses exceeds the threshold.

Example 26 includes the apparatus of any of Examples 22 to 25, further comprising means for restricting code cache lines from the workload to occupy the first chunk of ways for code for the workload, and means for restricting data cache lines from the workload to occupy the second chunk of ways for data for the workload.

Example 27 includes the apparatus of Example 26, further comprising means for decreasing priority of non-hit cache lines in only the first chunk of ways for code in response to a demand hit to a cache line in the first chunk of ways for code, and means for decreasing priority of non-hit cache lines in only the second chunk of ways for data in response to a demand hit to a cache line in the second chunk of ways for data.

Example 28 includes the apparatus of any of Examples 26 to 27, further comprising means for evicting a lowest priority cache line from only the first chunk of ways for code to insert a code cache line in the first chunk of ways for code, and means for evicting a lowest priority cache line from only the second chunk of ways for data to insert a data cache line in the second chunk of ways for data.

Example 29 includes at least one non-transitory machine readable medium comprising a plurality of instructions that, in response to being executed on a computing device, cause the computing device to determine if a workload has a large code footprint, and, if so determined, partition N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

Example 30 includes the at least one non-transitory machine readable medium of Example 29, comprising a plurality of further instructions that, in response to being executed on the computing device, cause the computing device to determine if the workload has the large code footprint based on a number of first level code cache misses from the workload and a number of first level data cache misses from the workload.

Example 31 includes the at least one non-transitory machine readable medium of Example 30, comprising a plurality of further instructions that, in response to being executed on the computing device, cause the computing device to count the number of first level code cache misses from the workload, count the number of first level data cache misses from the workload, and determine that the workload has the large code footprint if the counted number of first level code cache misses exceeds the counted number of first level data cache misses after a counted number of first level cache misses exceeds a threshold.

Example 32 includes the at least one non-transitory machine readable medium of Example 31, comprising a plurality of further instructions that, in response to being executed on the computing device, cause the computing device to reset the number of first level code cache misses to be half of the counted number of first level code cache misses after the counted number of first level cache misses exceeds the threshold, reset the number of first level data cache misses to be half of the counted number of first level data cache misses after the counted number of first level cache misses exceeds the threshold, and reset the number of first level cache misses to zero after the counted number of first level cache misses exceeds the threshold.

Example 33 includes the at least one non-transitory machine readable medium of any of Examples 29 to 32, comprising a plurality of further instructions that, in response to being executed on the computing device, cause the computing device to restrict code cache lines from the workload to occupy the first chunk of ways for code for the workload, and restrict data cache lines from the workload to occupy the second chunk of ways for data for the workload.

Example 34 includes the at least one non-transitory machine readable medium of Example 33, comprising a plurality of further instructions that, in response to being executed on the computing device, cause the computing device to decrease priority of non-hit cache lines in only the first chunk of ways for code in response to a demand hit to a cache line in the first chunk of ways for code, and decrease priority of non-hit cache lines in only the second chunk of ways for data in response to a demand hit to a cache line in the second chunk of ways for data.

Example 35 includes the at least one non-transitory machine readable medium of any of Examples 33 to 34, comprising a plurality of further instructions that, in response to being executed on the computing device, cause the computing device to evict a lowest priority cache line from only the first chunk of ways for code to insert a code cache line in the first chunk of ways for code, and evict a lowest priority cache line from only the second chunk of ways for data to insert a data cache line in the second chunk of ways for data.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
   a core;
   a first core cache memory at a first cache level, the first core cache memory coupled to the core;
   a shared core cache memory at a second cache level, the shared core cache memory coupled to the core;
   a first cache controller coupled to the core and communicatively coupled to the first core cache memory;
   a second cache controller coupled to the core and communicatively coupled to the shared core cache memory; and
   circuitry coupled to the core and communicatively coupled to the first cache controller and the second cache controller to:
   determine if a workload has a large code footprint, comprising the circuitry to determine if, after a counted first number of misses at the first cache level exceeds a threshold, a counted second number of code misses at the first cache level exceeds a counted third number of data misses at the first cache level, and, if so determined,
   partition N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

2. The integrated circuit of claim 1, wherein the circuitry is further to:
   count the second number of code misses at the first cache level from the workload; and
   count the third number of data misses at the first cache level from the workload.

3. The integrated circuit of claim 2, wherein the circuitry is further to:
   reset the second number of code misses at the first cache level to be half of the counted second number of code misses at the first cache level after the counted first number of misses at the first cache level exceeds the threshold;
   reset the third number of data misses at the first cache level to be half of the counted third number of data misses at the first cache level after the counted first number of misses at the first cache level exceeds the threshold; and
   reset the first number of misses at the first cache level to zero after the counted first number of misses at the first cache level exceeds the threshold.

4. The integrated circuit of claim 1, wherein the circuitry is further to:
   restrict code cache lines from the workload to occupy the first chunk of ways for code for the workload; and
   restrict data cache lines from the workload to occupy the second chunk of ways for data for the workload.

5. The integrated circuit of claim 4, wherein the circuitry is further to:
   decrease priority of non-hit cache lines in only the first chunk of ways for code in response to a demand hit to a cache line in the first chunk of ways for code; and
   decrease priority of non-hit cache lines in only the second chunk of ways for data in response to a demand hit to a cache line in the second chunk of ways for data.

6. The integrated circuit of claim 4, wherein the circuitry is further to:
   evict a lowest priority cache line from only the first chunk of ways for code to insert a code cache line in the first chunk of ways for code; and
   evict a lowest priority cache line from only the second chunk of ways for data to insert a data cache line in the second chunk of ways for data.

7. A method of controlling a cache, comprising:
   determining if a workload has a large code footprint, comprising determining if, after a counted first number of misses at a first cache level exceeds a threshold, a counted second number of code misses at the first cache level exceeds a counted third number of data misses at the first cache level; and, if so determined,
   partitioning N ways of a shared core cache memory into first and second chunks of ways with the first chunk of M ways reserved for code cache lines from the workload and the second chunk of N minus M ways reserved for data cache lines from the workload, where N and M are positive integer values and N minus M is greater than zero, and wherein the shared core cache memory is at a second cache level.

8. The method of claim 7, further comprising:
   counting the second number of code misses at the first cache level from the workload; and
   counting the third number of data misses at the first cache level from the workload.

9. The method of claim 8, further comprising:
   resetting the second number of code misses at the first cache level to be half of the counted second number of code misses at the first cache level after the counted first number of misses at the first cache level exceeds the threshold;
   resetting the third number of data misses at the first cache level to be half of the counted third number of data misses at the first cache level after the counted first number of misses at the first cache level exceeds the threshold; and
   resetting the first number of misses at the first cache level to zero after the counted first number of misses at the first cache level exceeds the threshold.

10. The method of claim 7, further comprising:
    restricting code cache lines from the workload to occupy the first chunk of ways for code for the workload; and
    restricting data cache lines from the workload to occupy the second chunk of ways for data for the workload.

11. The method of claim 10, further comprising:
    decreasing priority of non-hit cache lines in only the first chunk of ways for code in response to a demand hit to a cache line in the first chunk of ways for code; and
    decreasing priority of non-hit cache lines in only the second chunk of ways for data in response to a demand hit to a cache line in the second chunk of ways for data.

12. The method of claim 10, further comprising:
    evicting a lowest priority cache line from only the first chunk of ways for code to insert a code cache line in the first chunk of ways for code; and
    evicting a lowest priority cache line from only the second chunk of ways for data to insert a data cache line in the second chunk of ways for data.

13. An apparatus, comprising:
one or more processor cores;
a first core cache memory at a first cache level;
a shared core cache memory at a second cache level;
a first cache controller communicatively coupled to the first core cache memory;
a second cache controller communicatively coupled to the shared core cache memory; and
circuitry communicatively coupled to the first cache controller and the second cache controller to:
determine if a workload has a large code footprint, comprising the circuitry to determine if, after a counted first number of misses at the first cache level exceeds a threshold, a counted second number of code misses at the first cache level exceeds a counted third number of data misses at the first cache level, and, if so determined,
partition N ways of the shared core cache memory into first and second chunks of ways with the first chunk of M ways reserved for code cache lines from the workload and the second chunk of N minus M ways reserved for data cache lines from the workload, where N and M are positive integer values and N minus M is greater than zero.

14. The apparatus of claim 13, wherein the circuitry is further to:
count the second number of code misses at the first cache level from the workload; and
count the third number of data misses at the first cache level from the workload.

15. The apparatus of claim 14, wherein the circuitry is further to:
reset the second number of code misses at the first cache level to be half of the counted second number of code misses at the first cache level after the counted first number of misses at the first cache level exceeds the threshold;
reset the third number of data misses at the first cache level to be half of the counted third number of data misses at the first cache level after the counted first number of misses at the first cache level; and
reset the first number of misses at the first cache level to zero after the counted first number of misses at the first cache level exceeds the threshold.

16. The apparatus of claim 13, wherein the circuitry is further to:
restrict code cache lines from the workload to occupy the first chunk of ways for code for the workload; and
restrict data cache lines from the workload to occupy the second chunk of ways for data for the workload.

17. The apparatus of claim 16, wherein the circuitry is further to:
decrease priority of non-hit cache lines in only the first chunk of ways for code in response to a demand hit to a cache line in the first chunk of ways for code; and
decrease priority of non-hit cache lines in only the second chunk of ways for data in response to a demand hit to a cache line in the second chunk of ways for data.

18. The apparatus of claim 16, wherein the circuitry is further to:
evict a lowest priority cache line from only the first chunk of ways for code to insert a code cache line in the first chunk of ways for code; and
evict a lowest priority cache line from only the second chunk of ways for data to insert a data cache line in the second chunk of ways for data.

\* \* \* \* \*